(12) United States Patent
Ramchune et al.

(10) Patent No.: US 11,086,492 B2
(45) Date of Patent: Aug. 10, 2021

(54) METHOD AND SYSTEM FOR MONITORING OF DRILLING PARAMETERS

(71) Applicant: Chevron U.S.A. Inc., San Ramon, CA (US)

(72) Inventors: Devanand Ramchune, Humble, TX (US); Graham Mensa-Wilmot, Cypress, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/787,857

(22) Filed: Feb. 11, 2020

(65) Prior Publication Data

US 2020/0257420 A1 Aug. 13, 2020

Related U.S. Application Data

(60) Provisional application No. 62/805,106, filed on Feb. 13, 2019.

(51) Int. Cl.
*G06F 3/0484* (2013.01)
*E21B 49/02* (2006.01)
*E21B 49/00* (2006.01)

(52) U.S. Cl.
CPC .......... *G06F 3/0484* (2013.01); *E21B 49/003* (2013.01)

(58) Field of Classification Search
None
See application file for complete search history.

(56) References Cited

U.S. PATENT DOCUMENTS

| | | | | |
|---|---|---|---|---|
| 5,237,539 A | * | 8/1993 | Selman | E21B 44/00 367/25 |
| 6,021,377 A | * | 2/2000 | Dubinsky | E21B 7/068 702/9 |
| 6,152,246 A | * | 11/2000 | King | E21B 44/00 175/26 |
| 6,282,452 B1 | * | 8/2001 | DeGuzman | E21B 44/00 700/32 |
| 2002/0116129 A1 | * | 8/2002 | Alft | E21B 44/00 702/9 |
| 2003/0015351 A1 | * | 1/2003 | Goldman | E21B 44/005 175/39 |
| 2013/0144531 A1 | * | 6/2013 | Johnston | E21B 44/00 702/9 |

(Continued)

*Primary Examiner* — Arpan P. Savla
*Assistant Examiner* — Linda Huynh
(74) *Attorney, Agent, or Firm* — Esplin & Associates, PC

(57) ABSTRACT

A graphical user interface may provide visualization of comparison between planned value(s) and usage value(s) of a set of operating parameters for a tool. The graphical user interface may include a planned usage region and a usage region. The planned usage region may provide visualization of the planned value(s) for the tool. The usage region may provide visualization of the usage value(s) for the tool. The usage region may include a compliance section. The compliance section may provide visualization of whether the usage value(s) complies with the corresponding planned value(s) such that the compliance section includes different visual features based on whether the usage value(s) complies or does not comply with the corresponding planned value(s). The usage region may provide comments and/or recommendations based on the learnings from analysis of offset wells.

18 Claims, 6 Drawing Sheets

(56) References Cited

U.S. PATENT DOCUMENTS

| | | | |
|---|---|---|---|
| 2014/0077963 A1* | 3/2014 | Dankers | E21B 41/0021 340/853.1 |
| 2014/0246238 A1* | 9/2014 | Abbassian | E21B 47/10 175/40 |
| 2015/0029034 A1* | 1/2015 | Abbassian | E21B 44/00 340/853.2 |
| 2015/0275646 A1* | 10/2015 | Benson | E21B 47/024 700/275 |
| 2015/0275659 A1* | 10/2015 | Jarrot | G06F 3/04842 367/81 |
| 2015/0330204 A1* | 11/2015 | Hildebrand | E21B 44/00 700/282 |
| 2016/0053603 A1* | 2/2016 | Israel | E21B 47/00 702/6 |
| 2016/0274781 A1* | 9/2016 | Wilson | G06T 11/206 |
| 2018/0106134 A1* | 4/2018 | Meehan | E21B 47/00 |
| 2019/0024495 A1* | 1/2019 | Wise | G05B 19/18 |
| 2019/0078425 A1* | 3/2019 | Gillan | E21B 41/00 |

\* cited by examiner

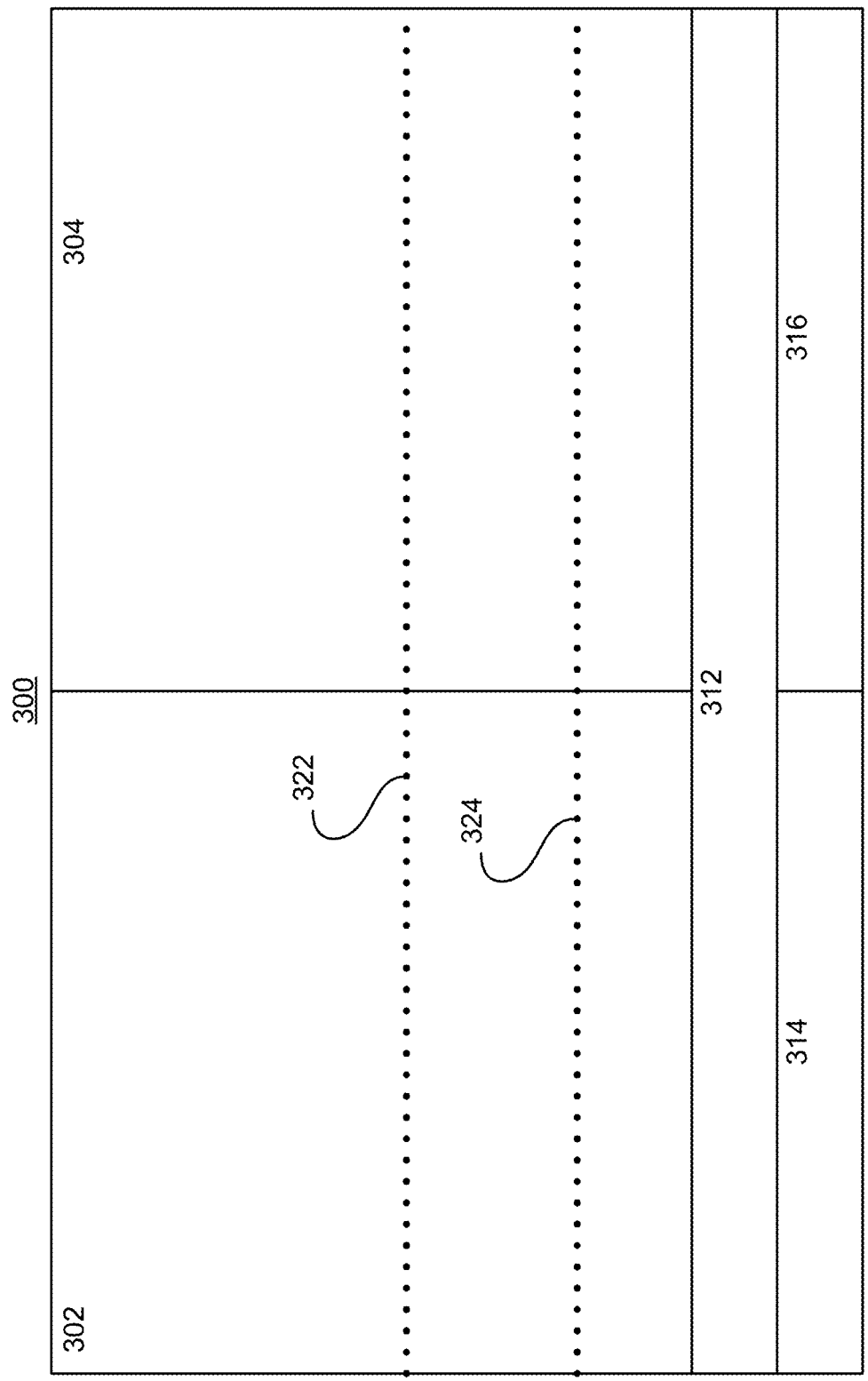

METHOD AND SYSTEM FOR MONITORING OF DRILLING PARAMETERS

CROSS-REFERENCE TO RELATED APPLICATION

The present application claims the benefit of U.S. Provisional Application No. 62/805,106, entitled "METHOD AND SYSTEM FOR MONITORING OF DRILLING PARAMETERS," which was filed on Feb. 13, 2019, the entirety of which are hereby incorporated herein by reference.

FIELD

The present disclosure relates generally to the field of monitoring of well drilling using visual displays.

BACKGROUND

Visual displays are used to identify whether a driller is applying drilling parameters that are recommended, e.g., either by a drilling program or by a drilling plan, also referred to as a "drilling roadmap," including limits identified by an operator's systematic approach to a performance drilling process. Drilling roadmaps establish specific drilling parameter ranges, with regards to weight on bit (WOB), revolutions per minute (RPM) and flow rate for specific sections, depth ranges or formations. When executed as planned, the drilling roadmap promotes efficient drilling practices, potential remediation of anticipated drilling dysfunctions, extends bottom hole assembly (BHA) life, facilitates achievement of established project performance qualifiers, e.g., footage, vibrations control, steering efficiency, rate of penetration (ROP), and the like, as ranked, and thus contributes to cycle time reduction.

SUMMARY

This disclosure relates to monitoring tool usage. Planned usage information for a tool, usage information for the tool, and/or other information may be obtained. The planned usage information may define one or more planned values of a set of operating parameters for the tool. The planned value(s) may include a first planned value of a first operating parameter for the tool. The usage information may define one or more usage values of the set of operating parameters for the tool. The usage value(s) may include a first usage value of the first operating parameter for the tool. Presentation of a graphical user interface on a display may be effectuated.

The graphical user interface may provide visualization of comparison between the planned value(s) and the usage value(s). The graphical user interface may include a planned usage region, a usage region, and/or other regions. The planned usage region may provide visualization of the planned value(s) of the set of operating parameters for the tool. The usage region may provide visualization of the usage value(s) of the set of operating parameters for the tool. The usage region may include a compliance section and/or other sections. The compliance section may provide visualization of whether at least one of the usage value(s) complies with a corresponding one of the planned value(s) such that the compliance section includes different visual features based on whether the usage value(s) complies or does not comply with the corresponding planned value(s). The compliance section may include a first visual feature based on the first usage value complying with the first planned value of the first operating parameter for the tool. The compliance section may include a second visual feature different from the first visual feature based on the first usage value not complying with the first planned value of the first operating parameter for the tool.

A system that monitors tool usage may include one or more electronic storage, one or more processors and/or other components. The electronic storage may store information relating to one or more tools, information relating to operating parameters for the tool(s), planned usage information, information relating to planned values of the operating parameters for the tool(s), usage information, information relating to usage values of the operating parameters for the tool(s), information relating to graphical user interface, information relating to comparison between the planned value(s) and the usage value(s), information relating to regions within the graphical user interface, information relating to sections within the region(s), and/or other information.

The processor(s) may be configured by machine-readable instructions. Executing the machine-readable instructions may cause the processor(s) to facilitate tool usage monitoring. The machine-readable instructions may include one or more computer program components. The computer program components may include one or more of a planned usage information component, a usage information component, a graphical user interface component, and/or other computer program components. In some implementations, the computer program components may include a deviation component.

The planned usage information component may be configured to obtain planned usage information for one or more tools and/or other information. A tool may refer to a device or an implement designed and/or used to carry out one or more functions. In certain embodiments, a bottomhole assembly (BHA) includes one or more of a positive displacement motor (PDM), a rotary steerable system (RSS), a stabilizer, a jar, a tool, a reamer, etc. In certain embodiments, a tool may include a drill bit for drilling into and/or through rock (e.g., sedimentary rock). Planned usage information for a tool may define one or more planned values of a set of operating parameters for the tool. A set of operating parameters for the tool may include one or more operating parameters for the tool. For example, the planned value(s) defined by the planned usage information may include a particular planned value of a particular operating parameter for the tool.

The usage information component may be configured to obtain usage information for one or more tools and/or other information. Usage information for a tool may define one or more usage values of the set of operating parameters for the tool. For example, the usage value(s) defined by the usage information may include a particular usage value of the particular operating parameter for the tool. The particular usage value may correspond to the particular planned value (defined by the planned usage information) of the operating parameter for the tool.

The graphical user interface component may be configured to effectuate presentation of one or more graphical user interfaces on one or more displays. The graphical user interface(s) may provide visualization of comparison between the planned value(s) and the usage value(s). For example, a graphical user interface presented by the graphical user interface component may include a planned usage region, a usage region, and/or other regions. In some implementations, the graphical user interface may include a comment region. In some implementations, the graphical user interface may include a summary region.

The planned usage region may provide visualization of the planned value(s) of the set of operating parameters for the tool. The usage region may provide visualization of the usage value(s) of the set of operating parameters for the tool. The comment region may include presentation of one or more reasons for selection of at least one of the planned value(s). The comment region may provide information on why certain values were selected as the planned value(s). The comment region may include presentation of one or more actions to be executed based on one or more deviations from forecasted trends and expectations.

In some implementations, the visualization of the usage value(s) may be overlaid onto the visualization of the planned value(s). In some implementations, the graphical user interface may include one or more flashing visual features based on a usage value not complying with a corresponding planned value of an operating parameter for the tool The summary region may provide one or more summaries of compliance of the usage values with the corresponding planned values. The summary region may be broken out based on one or more characteristics of the tool and/or one or more characteristics of the target of the tool. For example, the summary region may provide one or more summaries of compliance of a usage value with a corresponding planned value for one or more rock formations and/or one or more rock sections. That is, the summary region may provide summaries of compliance of the usage values with the corresponding planned values for different/individual rock formations and/or different/individual rock sections. In some implementations, one or more rock sections may include multiple rock formations. The graphical user interface may include formation indicators for different rock formations.

The planned usage region and/or the usage region may include one or more sections. For example, the planned usage region and/or the usage region may include a compliance section and/or other sections. The compliance section may provide visualization of whether one or more usage values complies with one or more corresponding planned values. The compliance section may include different visual features based on the compliance of the usage values with the corresponding planned values. For example, the compliance section may include one or more visual features based on a usage value complying with a corresponding planned value of an operating parameter for the tool. The compliance section may include one or more other visual features different from the above visual feature(s) based on the usage value not complying with the corresponding planned value of the operating parameter for the tool. For example, the compliance section may include one color (e.g., green) based on the usage value complying with the corresponding planned value and may include another/different color (e.g., red) based on the usage value not complying with the corresponding planned value.

In some implementations, a planned value of an operating parameter for the tool may include a range of values. The range of values may be defined by a minimum value (minimum limit) and/or a maximum value (maximum limit) of the operating parameter for the tool. Compliance of the corresponding usage value with the range of values may include the usage value being within the range of values (e.g., above the minimum value and below the maximum value). Non-compliance of the corresponding usage value with the range of values may include the usage value being outside the range of values (e.g., below the minimum value or above the maximum value).

The deviation component may be configured to determine when one or more usage values do not comply with one or more corresponding planned values. Responsive to a usage value not complying with a corresponding planned value of an operating parameter for the tool, the deviation component may be configured to prompt one or more users (e.g., person using the tool, person overseeing the usage of the tool, person assisting with the usage of the tool) to input one or more reasons for deviation of the usage value from the corresponding planned value. The reason(s) may be inputted by the user(s) via text (e.g., user entering characters and/or words via physical/virtual keyboard), voice (e.g., user's speech recorded via sound sensor/microphone), and/or other input. The reason(s) may be inputted by the user(s) during usage of the tool (e.g., during the deviation, before the deviation, after the deviation) and/or after the usage of the tool (e.g., during review of the usage of the tool).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 3A illustrates an example graphical user interface.

DETAILED DESCRIPTION

The present disclosure relates to methods and systems for monitoring well drilling using visual displays with limits, such as those identified from the operator's systematic approach to the performance drilling process. The visual displays are designed with a comments section that allows drillers to understand why certain drilling parameters were recommended based on known offset analysis. Having the comments and reasons for the recommended parameters allows field personnel to revert back to the planning team in the event that they are seeing something different than what was initially planned. This allows for incorporating the right people into the decision making process. By having a simple visual tool, running incorrect parameters which can lead to vibration, poor drilling performance and/or downhole tool failure can be avoided. The visual displays are designed to help the engineering team in the lookback process by calculating minimum, average and maximum values for key drilling parameters through the section drilled down to a formation level and the percentage adherence to the roadmap.

The roadmap identifies specific drilling parameter ranges, with regards to weight on bit (WOB), revolutions per minute (RPM) and flow rate for specific sections, depth ranges or formations. When executed as planned, the roadmap promotes efficient drilling practices, potential remediation of anticipated dysfunctions, extends bottom hole assembly (BHA) life, facilitates achievement of established project performance qualifiers, e.g., footage, vibrations control, steering efficiency, rate of penetration, etc., as ranked, and thus contributes to cycle time reduction.

The limits in the roadmap are determined via a detailed offset analysis which includes (but is not limited to) offset performances, section challenges, well profile and interval length, formation drillability, BHA/drill string design and its functional limitations, drive system type, and bits and reamers types.

The methods and systems disclosed provide improvements to known drilling roadmaps by enabling reasons for out of range circumstances to be captured and used in development of future roadmaps, while allowing operations to continue.

Figure 1:
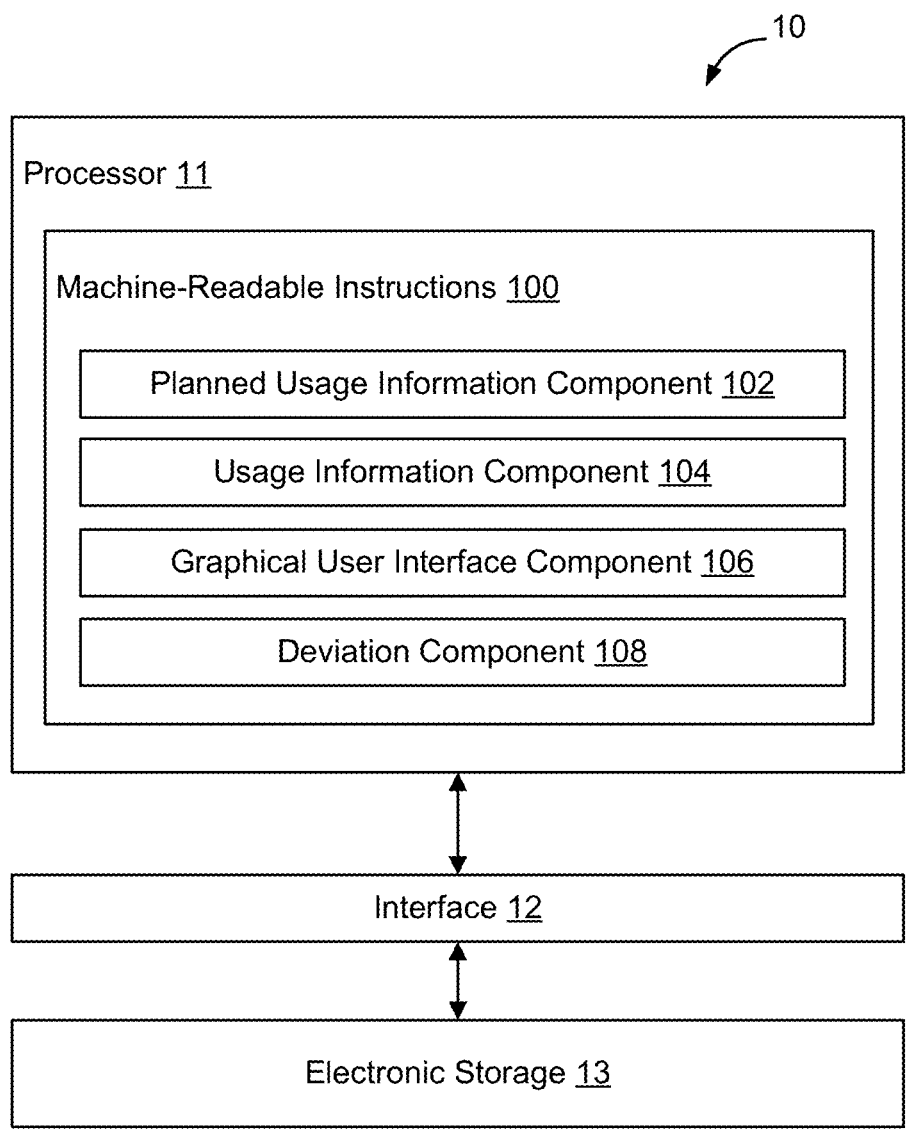
FIG. 1 illustrates an example system that monitors tool usage.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Planned usage information for a tool, usage information for the tool, and/or other information may be obtained by the processor 11. The planned usage information may define one or more planned values of a set of operating parameters for the tool. The planned value(s) may include a first planned value of a first operating parameter for the tool. The usage information may define one or more usage values of the set of operating parameters for the tool. The usage value(s) may include a first usage value of the first operating parameter for the tool. Presentation of a graphical user interface on a display may be effectuated by the processor 11.

The graphical user interface may provide visualization of comparison between the planned value(s) and the usage value(s). The graphical user interface may include a planned usage region, a usage region, and/or other regions. The planned usage region may provide visualization of the planned value(s) of the set of operating parameters for the tool. The usage region may provide visualization of the usage value(s) of the set of operating parameters for the tool. The usage region may include a compliance section and/or other sections. The compliance section may provide visualization of whether at least one of the usage value(s) complies with a corresponding one of the planned value(s) such that the compliance section includes different visual features based on whether the usage value(s) complies or does not comply with the corresponding planned value(s). The compliance section may include a first visual feature based on the first usage value complying with the first planned value of the first operating parameter for the tool. The compliance section may include a second visual feature different from the first visual feature based on the first usage value not complying with the first planned value of the first operating parameter for the tool.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to one or more tools, information relating to operating parameters for the tool(s), planned usage information, information relating to planned values of the operating parameters for the tool(s), usage information, information relating to usage values of the operating parameters for the tool(s), information relating to graphical user interface, information relating to comparison between the planned value(s) and the usage value(s), information relating to regions within the graphical user interface, information relating to sections within the region(s), and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate tool usage monitoring. The machine-readable instructions 100 may include one or more computer program components. The machine-readable instructions 100 may include one or more of a planned usage information component 102, a usage information component 104, a graphical user interface component 106, and/or other computer program components. In some implementations, the computer program components may include a deviation component 108.

The planned usage information component 102 may be configured to obtain planned usage information for one or more tools and/or other information. Obtaining planned usage information may include one or more of accessing, acquiring, analyzing, determining, examining, identifying, loading, locating, opening, receiving, retrieving, reviewing, selecting, storing, utilizing, and/or otherwise obtaining the planned usage information. The planned usage information component 102 may be configured to obtain the planned usage information from one or more locations. For example, the planned usage information component 102 may obtain planned usage information from a storage location, such as the electronic storage 13, electronic storage of a device accessible via a network, and/or other locations. The planned usage information component 102 may obtain planned usage information from one or more hardware components (e.g., a computing device, a component of a computing device, a sensor, a component of a drilling tool) and/or one or more software components (e.g., software running on a computing device). The planned usage information component 102 may be configured to obtain the planned usage information before, during, and/or after the usage of the tool. Planned usage information may be stored within a single file or multiple files.

A tool may refer to a device or an implement designed and/or used to carry out one or more functions. For example, a tool may include a drilling tool. A drilling tool may refer to a device or an implement designed and/or used for drilling. A drilling tool may be designed and/or used to drill one or more substances. For example, a drilling tool may include a drill bit for drilling into and/or through rock (e.g., sedimentary rock). A drilling tool to may refer to one or more portions of a device/implement that performs the drilling. A drilling tool may refer to portions of or entirety of a device/implement that performs drilling. For example, a drilling tool may refer to one or more portions of a drilling rig and/or the entirety of the drilling rig. Other tools and other drilling tools are contemplated.

Planned usage information for a tool may define one or more planned values of a set of operating parameters for the tool. A set of operating parameters for the tool may include one or more operating parameters for the tool. For example, the planned value(s) defined by the planned usage information may include one or more particular planned values of one or more particular operating parameters for the tool. An operating parameter for the tool may refer to a property of the tool whose value determines how the tool is used. An operating parameter for the tool may refer to a parameter applied and/or used for operating the tool.

An operating parameter for the tool may include one or more features and/or one or more qualities of the tool during operation. An operating parameter for the tool may include one or more conditions of the environment around and/or near the tool during operation. The value(s) of the operating parameter(s) for the tool may define the operation of the tool. The value(s) of the operating parameter(s) for the tool may be controlled and/or set to operate the tool in a particular manner. For example, the operating parameter(s) for a drilling tool may include one or more of drilling depth, total gas present, hookload, depth of bit, block position, torque (e.g., TQA torque), rotation speed (e.g., rotation per minute), rate of penetration, weight on bit, standpipe pressure, flowrate, pressure, stress, strain, mud weight in/out, active pit total, volume change, hole displacement, tank volume, strokes speed (e.g., strokes per minute), pump rate, equivalent circulating density, equivalent static density, whether one or more pumps are on or off, pick-up weight, slack-off weight, direction of movement of bit depth, direction of movement of block position, reamer neutral weight, bottom hole assembly speed (e.g., feet per minute), drag, block weight, friction factor, trip number, tool vibration, and/or other operating parameter(s).

A planned value of an operating parameter for the tool may refer to a value of the operating parameter for the tool to be used during tool operation. Planned values of the operating parameters for the tool may form a roadmap that guides the operation of the tool. For example, for a drilling tool, planned values of the operating parameters may form a drilling roadmap that establishes values of the operating parameters to be used while drilling holes (e.g., to increase drilling efficiency, to reduce cycle time, to reduce drilling time).

A planned value of an operating parameter for the tool may be static or dynamic. That is, the same planned value may be provided for the entire operation of the tool or different planned values may be provided for different parts of the operation of the tool. For example, for a drilling tools, planned values of the operating parameters may be defined as a function of spatial location (e.g., depth, formation type). A planned value of an operating parameter for tool may be based on one or more other operating parameters for the tool. For example, different planned values of a particular operating parameter may be provided based on different values of other operation parameter(s).

A planned value of an operating parameter for the tool may include a single value, multiple values, and/or a range of values. For example, a planned value of an operating parameter for the tool may include a specific value to be used, multiple values to be used, and/or a range of values to be used during operation. A range of values may be defined by a minimum value (minimum limit) and/or a maximum value (maximum limit) of the operating parameter for the tool.

Planned usage information for a tool may define planned value(s) of a set of operating parameters for the tool by including information that defines (e.g., reflects, quantifies, identifies, characterizes) one or more values, qualities, attributes, features, and/or other aspects of the planned value(s) of the set of operating parameters. For example, the planned usage information may define a planned value of an operating parameter for a tool by including information that makes up and/or is used to determine the planned value. Other types of planned usage information are contemplated.

The usage information component 104 may be configured to obtain usage information for one or more tools and/or other information. Obtaining usage information may include one or more of accessing, acquiring, analyzing, determining, examining, identifying, loading, locating, opening, receiving, retrieving, reviewing, selecting, storing, utilizing, and/or otherwise obtaining the usage information. The usage information component 104 may be configured to obtain the usage information from one or more locations. For example, the usage information component 104 may obtain usage information from a storage location, such as the electronic storage 13, electronic storage of a device accessible via a network, and/or other locations. The usage information component 104 may obtain usage information from one or more hardware components (e.g., a computing device, a component of a computing device, a sensor, a component of a drilling tool) and/or one or more software components (e.g., software running on a computing device). The usage information component 104 may be configured to obtain the usage information during and/or after the usage of the tool. For example, the usage information component 104 may obtain the usage information during operation of the tool to obtain real-time data for the tool and/or after the operation of the tool to obtain historical data for the tool. Usage information may be stored within a single file or multiple files.

Usage information for a tool may define one or more usage values of the set of operating parameters for the tool. For example, the usage value(s) defined by the usage information may include one or more particular usage values of one or more particular operating parameters for the tool. A usage value of an operating parameter for the tool may refer to an actual value of the operating parameter for the tool that is used (e.g., utilized, present) during tool operation. A particular usage value may correspond to a particular planned value (defined by the planned usage information) of the operating parameter for the tool. The planned value may include a value to be used during an operation of the tool (e.g., recommended value in a roadmap) and the usage value may include the actual value used during the operation of the tool. A usage value of an operating parameter for the tool may be static or dynamic. For example, same usage value may be used for the entire operation of the tool or different usage values may be used for different parts of the operation of the tool.

Usage information for a tool may define usage value(s) of a set of operating parameters for the tool by including information that defines (e.g., reflects, quantifies, identifies, characterizes) one or more values, qualities, attributes, features, and/or other aspects of the usage value(s) of the set of operating parameters. For example, the usage information may define a usage value of an operating parameter for a tool by including information that makes up and/or is used to determine the usage value. Other types of usage information are contemplated.

The graphical user interface component 106 may be configured to effectuate presentation of one or more graphical user interfaces on one or more displays. A graphical user interface may refer to a user interface with one or more visual elements. A graphical user interface may convey information in one or more visual forms. A graphical user interface may provide visualization of the planned value(s) and/or the usage value(s) for one or more tools. A graphical user interface may provide visualization of the planned value(s) and/or the usage value(s) by including/providing one or more visual representations of the planned value(s) and/or the usage value(s). Visual representations of the planned value(s) and/or the usage value(s) may include numerical representation, textual representation, graphical representations (e.g., line graphs, bar graphs, pie charts), and/or other visual representations.

A graphical user interface may provide visualization of the planned value(s) and/or the usage value(s) together and/or separately. For example, a graphical user interface may provide visualization of comparison between the planned value(s) and the usage value(s). For instance, a graphical user interface may provide a side-by-side view of the planned value(s) and/or the usage value(s), an overlapping view of the planned value(s) and/or the usage value(s), a view that indicates the differences between the planned value(s) and/or the usage value(s), and/or other views. Visualization of the comparison between the planned value(s) and the usage value(s) may enable determination of whether the usage of the tool complied with the planned value(s). For example, the visualization of the comparison between the planned value(s) and the usage value(s) may enable a tool operator to see whether the tool is operating in accordance with the planned value(s) (e.g., with the planned value(s), within the range of planned value(s).

Figure 3B:
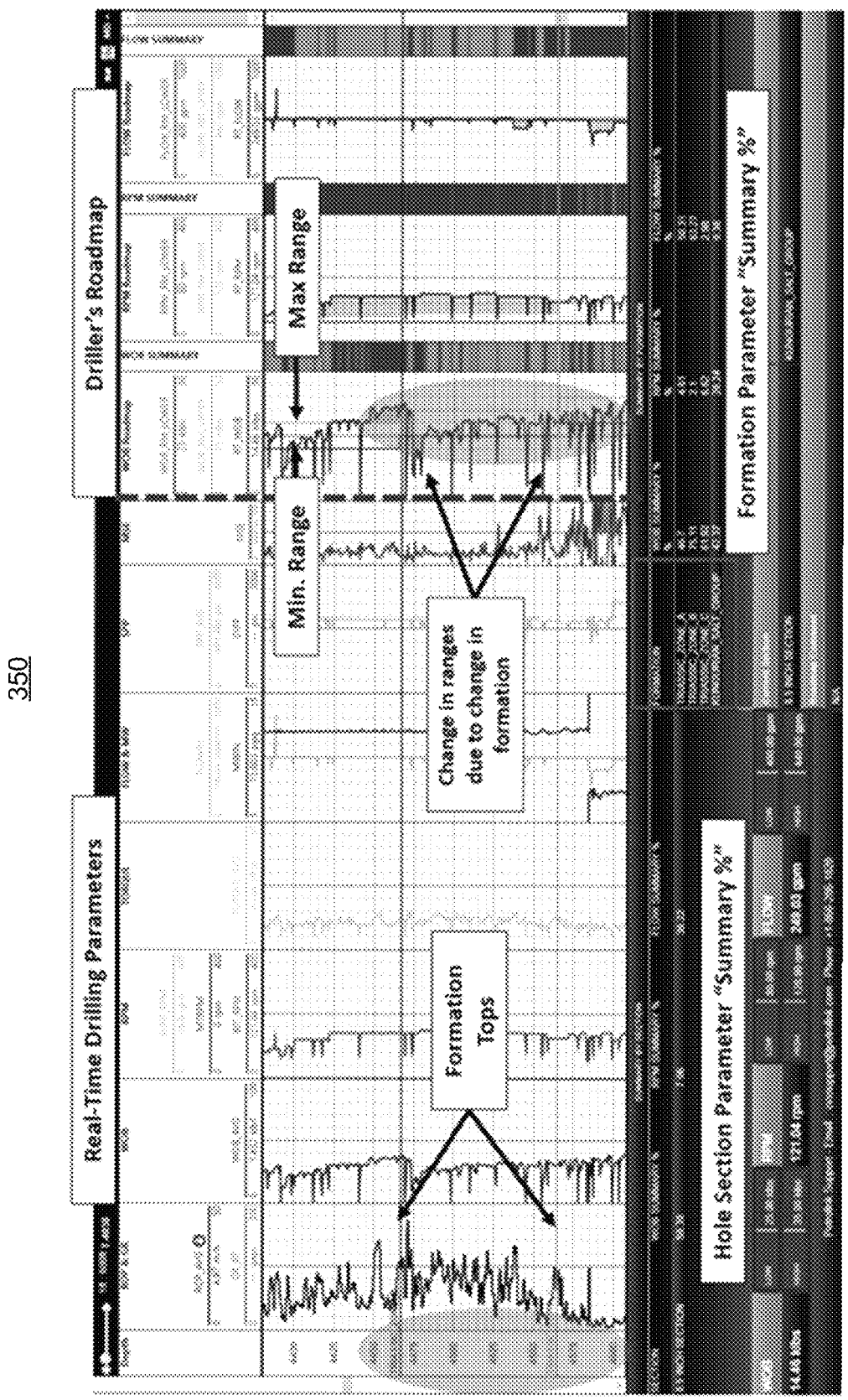
FIG. 3B illustrates an example graphical user interface.

FIG. 3A illustrates an example graphical user interface 300. The graphical user interface 300 may include a usage region 302, a planned usage region 304, a summary region 312, a parameter region 314, a comment region 316, and/or other regions. FIG. 3B illustrates an example graphical user interface 350. The graphical user interface 350 may include example visual representations that may be presented within different regions of the graphical user interface 300. Other visual representations and graphical user interfaces are contemplated.

The usage region 302 may provide visualization of usage value(s) of a set of operating parameters for a tool. The usage region 302 may include one or more graphical representations of the usage value(s) for the tool, such as line graphs that represent values of operating parameters (e.g., rate of penetration, weight on bit, rotation per minute, torque, flow, mud weight, standpipe pressure, mechanical specific energy) as a function of depth for a drilling tool. The usage region 302 may provide visualization of real-time drilling parameters for the drilling tool.

The planned usage region 304 may provide visualization of the planned value(s) of the set of operating parameters for the tool. The planned usage region 304 may include one or more graphical representations of the planned value(s) for the tool, such as line graphs that represent planned values of operating parameters (e.g., weight on bit, rotation per minute, flow) as a function of depth for a drilling tool. The planned usage region 304 may provide visualization of drilling parameter roadmaps for the drilling tools (e.g., values/ranges of values recommended at different depths).

In some implementations, the visualization of the usage value(s) may be overlaid onto the visualization of the planned value(s). The graphical representation(s) of the usage value(s) may be overlapped with the graphical representation(s) of the planned value(s). For example, in FIG. 3A, the graphical representation(s) of the usage value(s) may be presented on their own in the usage region 302, and may be presented with the graphical representation(s) of the planned value(s) in the planned usage region 304. For instance, in FIG. 3B, the line graphs that represent usage values of drilling parameters may be overlaid onto the line graphs that represent planned values of drilling parameters. Such presentation of the usage value(s) with the planned value(s) may enable a user to quickly determine whether or not the drilling tool was used with the planned (e.g., recommended) values.

The graphical user interface may include indicators for different aspects in which the tool is used. For example, for a drilling tool, the graphical user interface 300 may include formation indicators 322, 324 for different rock formations. The formation indicators 322, 324 may indicate the location of the top/bottom of different rock formations that are/to be drilled with the drilling tool. Such presentation of graphical indicators may enable a user to see how the usage value(s) and/or the planned value(s) for the drilling tool changes within different rock formations. Other indicators are contemplated.

The summary region 312 may provide one or more summaries of compliance of the usage values with the corresponding planned values. For example, the summary region 312 may provide information on number of instance, duration, and/or percentage of the drilling tool operation in which the usage values complied with and/or did not comply with the corresponding planned values. The summary region 312 may be broken out based on one or more characteristics of the tool and/or one or more characteristics of the target of the tool. For example, the summary region 312 may be broken out based on different rock formations and/or different rock sections through which the drilling tool was used. The summary region 312 provide one or more summaries of compliance of usage values with corresponding planned values for one or more rock formations and/or one or more rock sections. A rock section may refer to a grouping of one or more rock formations. For example, one or more of the rock sections may include multiple rock formations. The summary region 312 may provide summaries of compliance of the usage values with the corresponding planned values for different/individual rock formations and/or different/individual rock sections. For instance, in FIG. 3B, the graphical user interface 350 may provide summaries of compliance of the usage values with the corresponding planned values for sections (hole section parameter summary) and formations (formation parameter summary).

The parameter region 314 may provide information on usage values and/or planned values for different parts of the drilling tool operation. The information on the usage values and/or planned values may be provided in real-time (e.g., presenting the current usage values and the corresponding planned values during the drilling tool operation) and/or after during review of the drilling tool operation (e.g., presenting usage values at a specific time and/or depth and the corresponding planned values). For instance, in FIG. 3B, the graphical user interface 350 may provide the real-time values for weight on bit, rotation per minute, and flowrate, as well as the corresponding planned values (e.g., ranges of values).

The comment region 316 include presentation of one or more reasons for selection of at least one of the planned value(s). That is, the comment region 316 may provide information on why certain values were selected as the planned value(s). For example, for a drilling tool, the comment region 316 may provide information on why certain values and/or ranges of values of operating parameters for drilling tools, such as weight on bit, rotation per minute, torque, flow, mud weight, standpipe pressure, and/or mechanical specific energy were selected/recommended. For example, a planner may provide the factors, predicated drilling conditions, and/or desired result that led to the selection of the planned values. Provision of such information may enable the drilling tool operator to determine whether or not it is appropriate to deviate from the planned value(s).

The comment region 316 may include presentation of one or more actions to be executed based on one or more deviations from forecasted trends and/or expectations. The planned value(s) may have been selected based on forecasted trends and/or expectations of the drilling operation. The comment region 316 may provide information on how the drilling tool(s) may be operated in response to deviation of the drilling operation from the forecasted trends and/or expectations. For example, the comment region 316 may provide information on alternative planned value(s) to be used in response to certain deviations from forecasted trends and/or expectations. The comment region 316 may provide guidance on how to deviate from the planned value(s) in response to certain deviations from forecasted trends and/or expectations. Such information may be utilized during drilling to achieve the intended objective(s) of the drilling operation/roadmap. Presentation of other actions is contemplated.

The comment region 316 may include presentation of information relating to the planned values. For example, the comment region 316 may include presentation of information that guides the drilling tool operator on use of the drilling tool with respect to the drilling roadmap. For instance, when the planned values include a range of values within which it is recommended to operate the drilling tool, the comment region 316 may provide information on whether it is recommended to operate the drilling tool more in the high side of the range, the low side of the range, or middle side of the range. Other types of comments are contemplated.

A region of a graphical user interface may include one or more sections. For example, the summary region 312 may be divided into separate sections to provide different types of summaries (e.g., section summary, formation summary). As another example, the usage region 302 and/or the planned usage region 304 may include one or more sections. For instance, the usage region 302 and/or the planned usage region 304 may include a compliance section and/or other sections.

The compliance section may provide visualization of whether one or more usage values complies with one or more corresponding planned values. The compliance section may visually represent compliance of the usage value(s) with the corresponding planned value(s). A usage value may comply with a corresponding planned value based on the usage value being the same as the planned value, being within a threshold value of the planned value, falling within a planned range, and/or otherwise complying with the planned value. For example, a planned value of an operating parameter for the tool may include a range of values. The range of values may be defined by a minimum value (minimum limit) and/or a maximum value (maximum limit) of the operating parameter for the tool. Compliance of the corresponding usage value with the range of values may include the usage value being within the range of values (e.g., above the minimum value and below the maximum value). Non-compliance of the corresponding usage value with the range of values may include the usage value being outside the range of values (e.g., below the minimum value or above the maximum value). In some implementations, the usage value being at the limit (e.g., minimum value/maximum value) of the range of values may be treated as complying with the planned value. In some implementations, the usage value being at the limit (e.g., minimum value/maximum value) of the range of values may be treated as not complying with the planned value.

For example, the compliance section may include different visual features based on the compliance of the usage values with the corresponding planned values. For instance, the compliance section may include one or more visual features based on a usage value complying with a corresponding planned value of an operating parameter for the tool. The compliance section may include one or more other visual features different from the above visual feature(s) based on the usage value not complying with the corresponding planned value of the operating parameter for the tool. For example, the compliance section may include one color (e.g., green) and/or one pattern based on the usage value complying with the corresponding planned value and may include another/different color (e.g., red) and/or another/different pattern based on the usage value not complying with the corresponding planned value.

For instance, in FIG. 3B, the graphical user interface 350 may include compliance sections next to the WOB Roadmap, the RPM Roadmap, and the FLOW Roadmap, with individual compliance sections presenting different color based on whether the usage values for different drilling depths complied or did not comply with the corresponding planned values. The visual features may be presented based on the comparison between the usage values and the corresponding planned values for different depths. Other types of visual features are contemplated.

In some implementations, the graphical user interface may include one or more flashing visual features based on a usage value not complying with a corresponding planned value of an operating parameter for the tool. A flashing visual feature may refer to a visual feature that changes its visual characteristic (e.g., brightness, color) over time. For example, in FIG. 3B, one or more portions of the graphical user interface 350 may flash responsive to a usage value not complying with a corresponding planned value. For instance, the real time values for weight on bit, rotation per minute, and/or flowrate (and/or surrounding portions of the graphical user interface 350) may flash based on the values not complying with the corresponding planned values.

The deviation component 108 may be configured to determine when one or more usage values do not comply with one or more corresponding planned values. A usage value may not comply with a corresponding planned value based on the usage value being different from the planned value, not being within a threshold value of the planned value, falling outside a planned range, and/or otherwise not complying with the planned value. Responsive to a usage value not complying with a corresponding planned value of an operating parameter for the tool, the deviation component 108 may be configured to prompt one or more users (e.g., person using the tool, person overseeing the usage of the tool, person assisting with the usage of the tool) to input one or more reasons for deviation (non-compliance) of the usage value from the corresponding planned value. The deviation component 108 may prompt the user(s) to input reason(s) for deviation of the usage value from the corresponding planned value visually (e.g., via one or more visual messages presented within a graphical user interface), audibly (e.g., via one or more sounds played through one or more speakers), and/or through other communication medium.

The deviation component 108 may be configured to receive the user input through one or more user input/peripheral devices. For example, the reason(s) may be inputted by the user(s) via text (e.g., user entering characters and/or words via physical/virtual keyboard), voice (e.g., user's speech recorded via sound sensor/microphone), and/or other input, and the deviation component 108 may receive the user input through the user input/peripheral devices used by the user. The reason(s) may be inputted by the user(s) during usage of the tool (e.g., during the deviation, before the deviation, after the deviation of the usage value from the corresponding planned value) and/or after the usage of the tool (e.g., during review of the usage of the tool).

Although the roadmap for usage of the tool may be carefully prepared, unexpected tool operating condition may require operation of the tool that deviates from the planned value(s). For example, for a drilling tool, unplanned events, different geologic conditions, and/or premature failure of mechanical parts may interfere with the drilling operation. This may require the drilling operation to be performed using unplanned values. In such a case, reasons for deviations from the planned values may be captured by the deviation component 108. The reasons for deviations from the planned values may be used to improve upon plans for drilling tool operations, such as by being reworked into roadmaps for future projects on similar drilling sites. In some implementations, one or more message may be presented to indicate that it is acceptable to deviate from the planned values provided that the user(s) understands and/or records why it is necessary to deviate from the planned values.

Figure 4A:
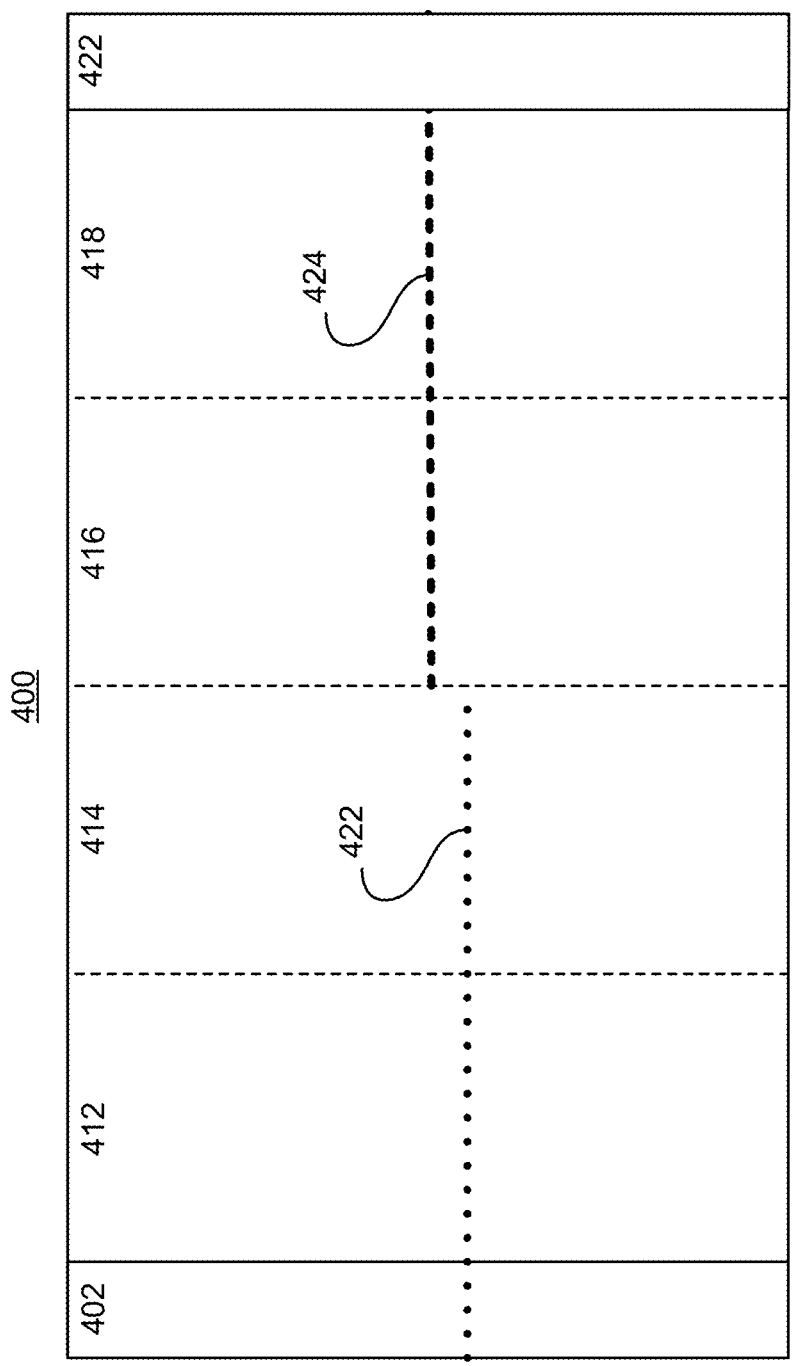
FIG. 4A illustrates an example graphical user interface.

FIG. 4A illustrates an example graphical user interface 400. The graphical user interface may provide one or more offset comparison display. An offset comparison display may provide visualization of comparison between well performances. For example, an offset comparison display may provide visualization of a well's performance against one or more of comparison wells, such as a benchmark well, offset well, best-in-class well, and/or other wells.

Figure 4B:
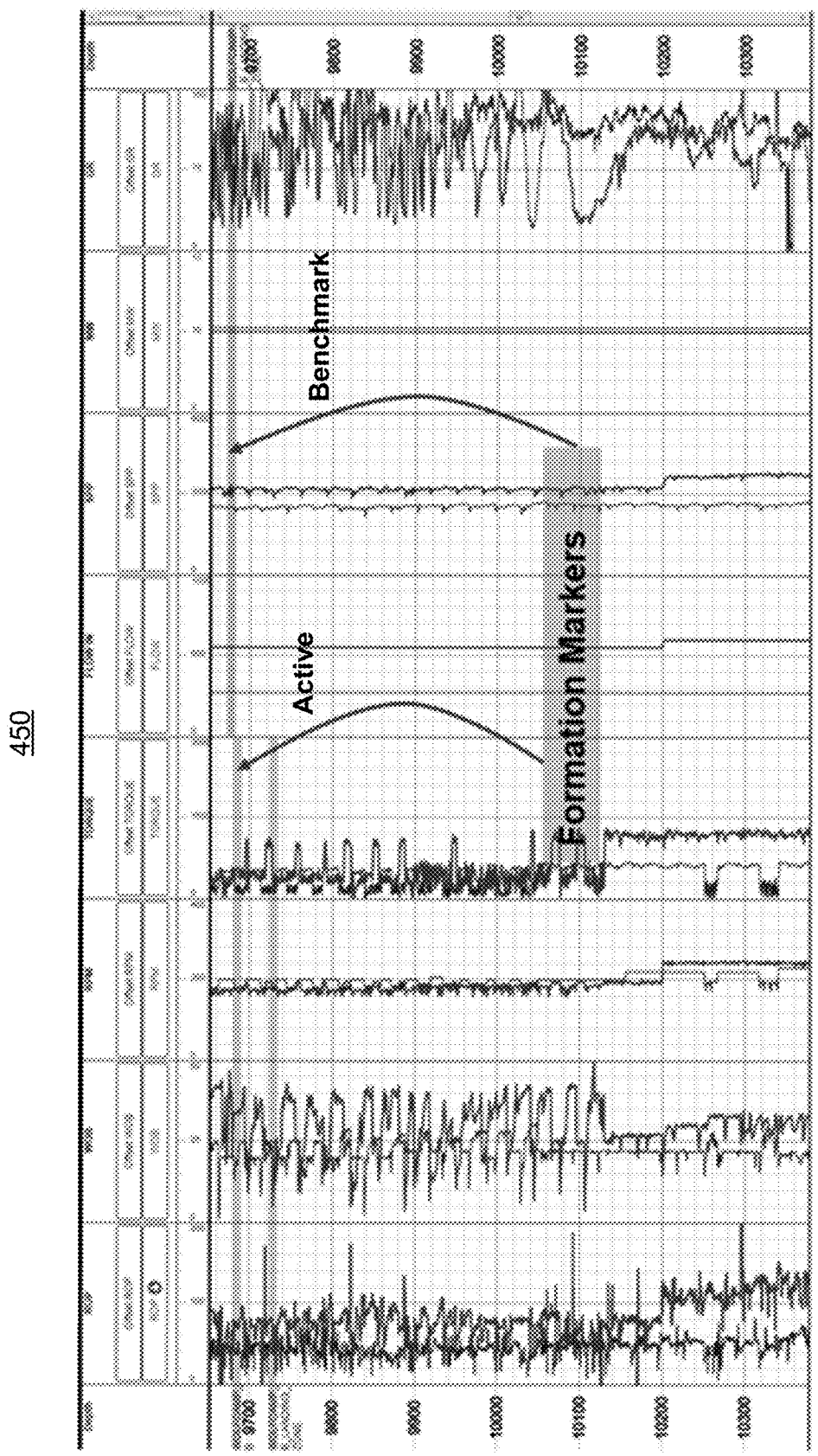
FIG. 4B illustrates an example graphical user interface.

The graphical user interface 400 may include depth regions 402, 422, comparison regions 412, 414, 416, 418, and/or other regions. FIG. 4B illustrates an example graphical user interface 450. The graphical user interface 450 may include example visual representations that may be presented within different regions of the graphical user interface 400. Other visual representations and graphical user interfaces are contemplated.

The depth regions 402, 422 may provide information on depth at which drilling is occurred and/or has occurred. For example, as shown in FIG. 4B, the graphical user interface 450 may include depth markers indicating depth of drilling on left and right sides. The comparison regions 412, 414, 416, 418 may provide visualization of comparison between operating parameter values (e.g., usage values, planned values) for the well (e.g., active well) and the comparison well(s). Individual comparison regions 412, 414, 416, 418 may provide visualization of different operating parameter values. For example, in FIG. 4B, the graphical user interface 450 may provide visualization of comparison between usage values of the well and the comparison well for the following operating parameters: rate of penetration, weight on bit, rotation per minute, torque, flow in, standpipe pressure, mud weight, and gamma ray.

The graphical user interface 400 may include formation indicators 422, 424. The formation indicators 422, 424 may indicate the location of the top/bottom of rock formations for a well and a comparison well. Such presentation of graphical indicators may enable a user to better compare the value(s) of operating parameters between the well and the comparison well for different formations.

The visualizations and graphical user interfaces describe herein may enable monitoring of tool usage. For example, for a drilling too, the visualizations and graphical user interfaces enable monitoring of roadmap execution during drilling tool usage. The visualizations and graphical user interfaces may facilitate real time and historical monitoring of the drilling roadmaps by the entire project team, both field and office based personnel, thereby enabling real-time collaborative discussions. The visualizations and graphical user interfaces may enable determination as to whether recommended drilling parameter ranges are being executed as planned. The visualizations and graphical user interfaces may facilitate lookback process for tool usage, such as by providing minimum, average, and/or maximum values for drilling parameters through the sections/formations drilled and the percentage of adherence to the roadmap. The visualizations and graphical user interfaces may facilitate lookback statistical analysis, such as statistical analysis regarding drilling parameters.

The visualizations and graphical user interfaces may facilitate drill off tests while staying within the recommended ranges to dynamically sustain and/or improve drilling performance. Information provided by the visualizations and the graphical user interfaces may assist planning engineers in striving towards continuous cycle time reduction.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
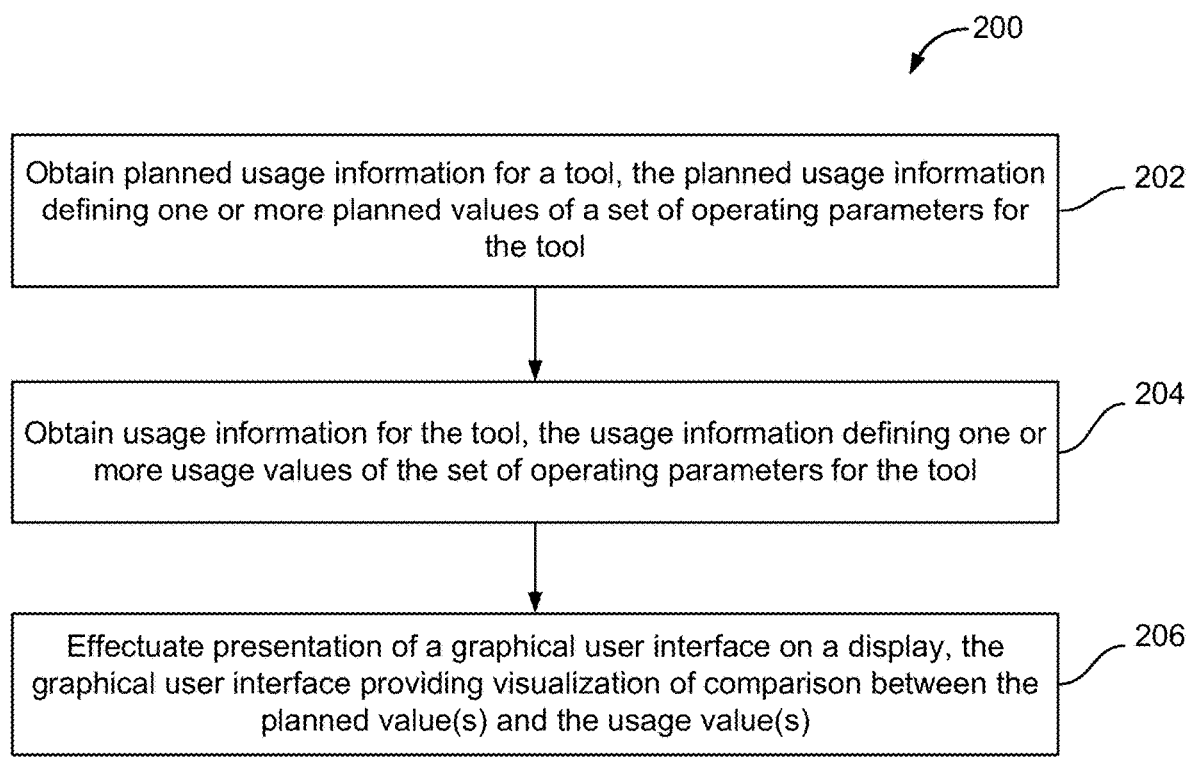
FIG. 2 illustrates an example method for monitoring tool usage.

FIG. 2 illustrates method 200 for monitoring tool usage. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, planned usage information for a tool may be obtained. The planned usage information may define one or more planned values of a set of operating parameters for the tool. The planned value(s) may include a first planned value of a first operating parameter for the tool. In some implementation, operation 202 may be performed by a processor component the same as or similar to the planned usage information component 102 (Shown in FIG. 1 and described herein).

At operation 204, usage information for the tool may be obtained. The usage information may define one or more usage values of the set of operating parameters for the tool. The usage value(s) may include a first usage value of the first operating parameter for the tool. In some implementation, operation 204 may be performed by a processor component the same as or similar to the usage information component 104 (Shown in FIG. 1 and described herein).

At operation 206, presentation of a graphical user interface on a display may be effectuated. The graphical user interface may provide visualization of comparison between the planned value(s) and the usage value(s). The graphical user interface may include a planned usage region, a usage region, and/or other regions. The planned usage region may provide visualization of the planned value(s) of the set of operating parameters for the tool. The usage region may provide visualization of the usage value(s) of the set of operating parameters for the tool. The usage region may include a compliance section and/or other sections. The compliance section may provide visualization of whether at least one of the usage value(s) complies with a corresponding one of the planned value(s) such that the compliance section includes different visual features based on whether the usage value(s) complies or does not comply with the corresponding planned value(s). The compliance section may include a first visual feature based on the first usage value complying with the first planned value of the first operating parameter for the tool. The compliance section may include a second visual feature different from the first visual feature based on the first usage value not complying with the first planned value of the first operating parameter for the tool. In some implementation, operation 206 may be performed by a processor component the same as or similar to the graphical user interface component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for monitoring tool usage, the system comprising:
   one or more physical processors configured by machine-readable instructions to:
      obtain planned usage information for a tool, the planned usage information defining planned values of a set of operating parameters for the tool as a function of depth, the planned values including a first planned value of a first operating parameter for the tool and a second planned value of a second operating parameter for the tool;
      obtain usage information for the tool, the usage information defining usage values of the set of operating parameters for the tool as the function of depth, the usage values including a first usage value of the first operating parameter for the tool and a second usage value of the second operating parameter for the tool; and
      effectuate presentation of a graphical user interface on a display, the graphical user interface providing visualization of comparison between the planned values and the usage values, wherein the graphical user interface includes:
         a usage region providing visualization of the one or more usage values of the set of operating parameters for the tool as the function of depth in forms of usage line graphs within the usage region, the usage region including separate usage sections for presentation of separate usage line graphs such that the usage region includes a first usage section for presentation of a first usage line graph for the first usage value of the first operating parameter and a second usage section different from the first usage section for presentation of a second usage line graph for the second usage value of the second operating parameter;
         a planned usage region separate from the usage region, the planned usage region providing visualization of the planned values of the set of operating parameters for the tool as the function of depth in forms of planned usage line graphs within the planned usage region, the planned usage region including separate planned usage sections for presentation of separate planned usage line graphs such that the planned usage region includes a first planned usage section for presentation of a first planned usage line graph for the first planned value of the first operating parameter and a second planned usage section different from the first planned usage section for presentation of a second planned usage line graph for the second planned value of the second operating parameter, wherein the separate planned usage sections further include additional presentation of corresponding usage line graphs overlaid onto the planned usage line graphs such that the first planned usage section includes an additional presentation of the first usage line graph overlaid onto the first planned usage line graph and the second planned usage section includes an additional presentation of the second usage line graph overlaid onto the second planned usage line graph; and
         separate compliance sections adjacent to individual ones of the separate planned usage sections, an individual compliance section providing visualization of whether a given usage value complies with a given planned value for a given operating parameter in a form of a colored bar that extends along a direction representing depth, the colored bar having sections of different color based on whether or not the given usage value complies with the given planned value;
      wherein:
         a first compliance section is adjacent to the first planned usage section, the first compliance section providing visualization of whether the first usage value complies with the first planned value of the first operating parameter for the tool in a form of a first colored bar, the first colored bar having a section of:
            a first color based on the first usage value complying with the first planned value of the first operating parameter for the tool; and
            a second color based on the first usage value not complying with the first planned value of the first operating parameter for the tool, the second color different from the first color; and
         a second compliance section is adjacent to the second planned usage section, the second compliance section providing visualization of whether the second usage value complies with the second planned value of the second operating parameter for the tool in a form of a second colored bar, the second colored bar having a section of:
            the first color based on the second usage value complying with the second planned value of the second operating parameter for the tool; and
            the second color based on the second usage value not complying with the second planned value of the second operating parameter for the tool.

2. The system of claim 1, wherein the first planned value of the first operating parameter for the tool includes a range of values, the range of values defined by a minimum value and a maximum value of the first operating parameter for the tool.

3. The system of claim 2, wherein the minimum value and the maximum value of the first operating parameter for the tool are visualized as separate planned usage line graphs within the first planned usage section.

4. The system of claim 1, wherein the graphical user interface further includes a comment region, the comment region including presentation of one or more predicted drilling conditions based on which at least one of the planned values were selected for planned usage of the tool, further wherein a user of the tool determines whether to deviate from the at least one of the planned values during usage of the tool based on the one or more predicted drilling conditions presented in the comment region.

5. The system of claim 4, wherein:
the planned values are selected based on forecasted trends and expectations of a drilling operation;
the comment region further includes presentation of one or more actions to be executed during the usage of the tool based on one or more deviations from the forecasted trends and expectations of the drilling operation such that the comment region provides information on how to deviate from the planned values in response to the one or more deviations from the forecasted trends and expectations of the drilling operation.

6. The system of claim 1, wherein:
the tool includes a drill bit; and
the graphical user interface further includes a summary region, the summary region providing summaries of compliance of the given usage value with the given planned value for the given operating parameter for one or more rock formations or one or more rock sections.

7. The system of claim 6, wherein at least one of the one or more rock sections include multiple rock formations, and the graphical user interface further includes formation indicators for different rock formations.

8. The system of claim 1, wherein the one or more physical processors are further configured by the machine-readable instructions to:
responsive to the first usage value not complying with the first planned value of the first operating parameter for the tool, prompt a user of the tool to input via text entered using a keyboard or voice recorded using a microphone one or more reasons for the user operating the tool to not comply with the first planned value during usage of the tool.

9. The system of claim 1, wherein the graphical user interface further includes a flashing visual feature based on the first usage value not complying with the first planned value of the first operating parameter for the tool.

10. A method for monitoring tool usage, the method comprising:
obtaining planned usage information for a tool, the planned usage information defining planned values of a set of operating parameters for the tool as a function of depth, the planned values including a first planned value of a first operating parameter for the tool and a second planned value of a second operating parameter for the tool;
obtaining usage information for the tool, the usage information defining values of the set of operating parameters for the tool as the function of depth, the usage values including a first usage value of the first operating parameter for the tool and a second usage value of the second operating parameter for the tool; and
effectuating presentation of a graphical user interface on a display, the graphical user interface providing visualization of comparison between the planned values and the usage values, wherein the graphical user interface includes:
a usage region providing visualization of the usage values of the set of operating parameters for the tool as the function of depth in forms of usage line graphs within the usage region, the usage region including separate usage sections for presentation of separate usage line graphs such that the usage region includes a first usage section for presentation of a first usage line graph for the first usage value of the first operating parameter and a second usage section different from the first usage section for presentation of a second usage line graph for the second usage value of the second operating parameter;
a planned usage region separate from the usage region, the planned usage region providing visualization of the planned values of the set of operating parameters for the tool as the function of depth in forms of planned usage line graphs within the planned usage region, the planned usage region including separate planned usage sections for presentation of separate planned usage line graphs such that the planned usage region includes a first planned usage section for presentation of a first planned usage line graph for the first planned value of the first operating parameter and a second planned usage section different from the first planned usage section for presentation of a second planned usage line graph for the second planned value of the second operating parameter, wherein the separate planned usage sections further include additional presentation of corresponding usage line graphs overlaid onto the planned usage line graphs such that the first planned usage section includes an additional presentation of the first usage line graph overlaid onto the first planned usage line graph and the second planned usage section includes an additional presentation of the second usage line graph overlaid onto the second planned usage line graph; and
separate compliance sections adjacent to individual ones of the separate planned usage sections, an individual compliance section providing visualization of whether a given usage value complies with a given planned value for a given operating parameter in a form of a colored bar that extends along a direction representing depth, the colored bar having sections of different color based on whether or not the given usage value complies with the given planned value;
wherein:
a first compliance section is adjacent to the first planned usage section, the first compliance section providing visualization of whether the first usage value complies with the first planned value of the first operating parameter for the tool in a form of a first colored bar, the first colored bar having a section of:
a first color based on the first usage value complying with the first planned value of the first operating parameter for the tool; and
a second color based on the first usage value not complying with the first planned value of the first operating parameter for the tool, the second color different from the first color; and
a second compliance section is adjacent to the second planned usage section, the second compliance section providing visualization of whether the second usage value complies with the second planned value of the second operating parameter for the tool in a form of a second colored bar, the second colored bar having a section of:
the first color based on the second usage value complying with the second planned value of the second operating parameter for the tool; and
the second color based on the second usage value not complying with the second planned value of the second operating parameter for the tool.

11. The method of claim 10, wherein the first planned value of the first operating parameter for the tool includes a range of values, the range of values defined by a minimum value and a maximum value of the first operating parameter for the tool.

12. The method of claim 11, wherein the minimum value and the maximum value of the first operating parameter for the tool are visualized as separate planned usage line graphs within the first planned usage section.

13. The method of claim 10, wherein the graphical user interface further includes a comment region, the comment region including presentation of one or more predicted drilling conditions based on which at least one of the planned values were selected for planned usage of the tool, further wherein a user of the tool determines whether to deviate from the at least one of the planned values during usage of the tool based on the one or more predicted drilling conditions presented in the comment region.

14. The method of claim 13, wherein:
the planned values are selected based on forecasted trends and expectations of a drilling operation;
the comment region further includes presentation of one or more actions to be executed during the usage of the tool based on one or more deviations from the forecasted trends and expectations of the drilling operation such that the comment region provides information on how to deviate from the planned values in response to the one or more deviations from the forecasted trends and expectations of the drilling operation.

15. The method of claim 10, wherein:
the tool includes a drill bit; and
the graphical user interface further includes a summary region, the summary region providing summaries of compliance of the given usage value with the given planned value for the given operating parameter for one or more rock formations or one or more rock sections.

16. The method of claim 15, wherein at least one of the one or more rock sections include multiple rock formations, and the graphical user interface further includes formation indicators for different rock formations.

17. The method of claim 10, further comprising:
responsive to the first usage value not complying with the first planned value of the first operating parameter for the tool, prompting a user of the tool to input via text entered using a keyboard or voice recorded using a microphone one or more reasons for the user operating the tool to not comply with the first planned value during usage of the tool.

18. The method of claim 10, wherein the graphical user interface further includes a flashing visual feature based on the first usage value not complying with the first planned value of the first operating parameter for the tool.

* * * * *

UNITED STATES PATENT AND TRADEMARK OFFICE
CERTIFICATE OF CORRECTION

Page 1 of 1

PATENT NO. : 11,086,492 B2
APPLICATION NO. : 16/787857
DATED : August 10, 2021
INVENTOR(S) : Devanand Ramchune et al.

It is certified that error appears in the above-identified patent and that said Letters Patent is hereby corrected as shown below:

In the Claims

In Claim 1, Column 17, Line 42-43, please delete "one or more" therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*